United States Patent [19]

Nagahori

[11] Patent Number: 5,430,765
[45] Date of Patent: Jul. 4, 1995

[54] DIGITAL DATA RECEIVER HAVING DC OFFSET CANCELLING PREAMPLIFIER AND DUAL-MODE TRANSIMPEDANCE AMPLIFIER

[75] Inventor: Takeshi Nagahori, Tokyo, Japan

[73] Assignee: NEC Corporation, Tokyo, Japan

[21] Appl. No.: 92,071

[22] Filed: Jul. 16, 1993

[30] Foreign Application Priority Data

Jul. 16, 1992 [JP] Japan .................. 4-189007

[51] Int. Cl.$^6$ .................. H04L 25/06; H04L 25/10; H04L 25/08
[52] U.S. Cl. .................. 375/318; 375/345; 330/259
[58] Field of Search .................. 375/76, 75, 98; 359/189, 193; 328/164, 146; 307/268, 260, 358-360, 264, 279, 350, 354; 330/261, 259, 285, 308, 59, 96, 69

[56] References Cited

U.S. PATENT DOCUMENTS

| | | | |
|---|---|---|---|
| 3,688,205 | 8/1972 | Burger | 375/76 |
| 4,577,155 | 3/1986 | Kobayashi et al. | 375/76 |
| 4,724,315 | 2/1988 | Goerne | 359/189 |
| 4,736,391 | 4/1988 | Siegel | 375/76 |
| 4,792,998 | 12/1988 | Toussaint | 359/189 |
| 5,025,456 | 6/1991 | Ota et al. | 375/98 |
| 5,119,404 | 6/1992 | Aihara | 375/76 |
| 5,295,161 | 3/1994 | Dreps et al. | 375/76 |

Primary Examiner—Stephen Chin
Assistant Examiner—Tesfaldet Bocure
Attorney, Agent, or Firm—Sughrue, Mion, Zinn, Macpeak & Seas

[57] ABSTRACT

A digital data receiver comprises a pre-amplifier for receiving a digital data input signal and a correction signal to produce a data output signal. A dc offset cancelling circuit is responsive to the data output signal for generating the correction signal to cancel dc offset contained in the digital data input signal. A post-amplifier receives the data output signal from the pre-amplifier and a reference signal. A peak detector is responsive to an output of the post-amplifier for detecting a peak amplitude thereof and generating the reference signal so that the post-amplifier has a first gain value during the time the data input signal is absent or less than its peak amplitude, and a second gain value approximately equal to twice the first gain value for a predetermined time after the peak amplitude of the data input signal is reached. The post-amplifier and peak detector have substantially equal operating characteristics.

19 Claims, 5 Drawing Sheets

DIGITAL DATA RECEIVER HAVING DC OFFSET CANCELLING PREAMPLIFIER AND DUAL-MODE TRANSIMPEDANCE AMPLIFIER

BACKGROUND OF THE INVENTION

1. Field of the Invention

The present invention relates generally to digital data receivers and more specifically to a receiver for receiving digital data, particularly for optical digital signals.

2. Description of the Related Art

In a conventional de-coupled optical receiver, an optical detector delivers a current output proportional to the optical power input received by the detector. This current is converted to a voltage by a current-to-voltage converter or transimpedance amplifier, and delivered to one input of a decision circuit where an intermediate voltage is compared to a reference voltage or decision threshold and the analog input signal to a digital output signal is converted at one of discrete values depending on whether the input is above or below the reference voltage. Ideally, the dc level of the transimpedance amplifier output should match the logic threshold of the decision circuit so that the amplifier output swings symmetrically above and below the reference voltage depending on the presence or absence of an optical input. When the optical input signal is very small, the corresponding voltage swing at the amplifier output will be small and the decision circuit may be unable to detect logic transition. Moreover, even if the reference voltage is chosen such that logic transition is detectable, pulse-width distortion will result if the reference voltage is not centered at one-half of the sum of the minimum and maximum excursions of the input signal. Correspondingly, if the amplitude of the input pulse changes, the reference voltage must also change to minimize pulse-width distortion. U.S. Pat. No. 5,025,456, Y. Ota et al., discloses an adaptive circuit technique for a burst-mode optical receiver that measures the amplitude of an incoming signal and sets the proper reference level during the period of a burst. The adaptive circuit includes a differential amplifier having a first input for receiving a data input signal and a second input for receiving a reference signal. A peak detector is connected to the output of the differential amplifier via a feedback resistor for generating the reference signal such that the amplifier has a first gain value and a first bandwidth when the data input signal is less than its peak amplitude or during the absence of the data input signal and has a second gain value approximately equal to twice the first gain value and a second bandwidth approximately one-half the first bandwidth for a predetermined time after the peak amplitude of the data input signal is reached. The modes of operation in which the amplifier has the first and second gain values are called a "cold" mode and a "warm" mode, respectively.

Various problems are inherent in the prior art burst-mode optical receiver. One shortcoming is that when a dc offset occurs in the optical input due to photodetector's dark current, low extinction ratio and optical crosstalk and the like, the differential amplifier cannot adapt to the changing dc level and the reference signal remains unchanged. As a result, it is likely that a relatively low-level optical input exceeds the level of the reference signal and erroneously interpreted as a high-level signal.

Another aspect of interest is the thermal noise generated by the feedback resistor. To minimize the thermal noise it is important that the feedback resistor be chosen to have as large a resistance value as the bandwidth would permit. During the cold mode, the minimum amplitude of an optical data input signal that can be detected is determined by the difference between the reference voltage and the amplifier output that is generated in response to a series of relatively low-level data input signals. This voltage difference determines the feedback resistor for the cold mode. However, this voltage difference is be determined only in a range where a sufficient margin is allowed for the noise. On the other hand, the resistance of the feedback resistor for the warm mode can be chosen in a range which the bandwidth of the warm mode permits. However, with the prior art optical receiver the feedback resistor is limited to one half of its optimum resistance value of the warm mode if it is optimized for the cold mode.

Additionally, if the input signal is an initial sequence of relatively high amplitude pulses followed by a sequence of relatively low amplitude pulses, the output of the peak detector would decay due to spontaneous discharge during the period of the subsequent low-amplitude pulse sequence and the transimpedance amplifier switches from a "warm" mode to a "cold" mode. Therefore, the transimpedance amplifier is not quickly adaptive to varying input levels, failing to adjust its decision threshold prior to the arrival of the subsequent low-amplitude pulse sequence and resulting in decision errors. This required that successive pulse sequences be spaced at sufficient amount of time interval, or guard time.

A further aspect of interest is the limitations imposed on design freedom. Because of the necessity to simultaneously meet the requirement of a low-noise differential amplifier and the requirement of a high-speed peak detector that can operate with a sufficient phase margin to prevent voltage-follower oscillation, and because of the necessity that they have substantially matched operating characteristics, the freedom of design has been limited.

SUMMARY OF THE INVENTION

It is therefore an object of the present invention to provide a digital data receiver which adaptively controls the decision threshold without being adversely affected by dc offset.

Another object of this invention is to provide a digital data receiver which permits optimum design in terms of thermal noise for different modes of transimpedance amplifier operation.

A further object of this invention is to provide a digital data receiver which allows reception of successive pulse sequences of different amplitudes with a minimum of decision errors.

A still further object of this invention is to provide a digital data receiver which permits freedom for optimum design for a differential amplifier and a peak detector.

A still further object of this invention is to provide a digital data receiver which operates in a wide range of temperatures and operating voltages.

According to a first aspect of the present invention, there is provided a digital data receiver comprising a differential pre-amplifier for receiving a digital data input signal and a correction signal and producing therefrom a data output signal, a dc offset cancelling circuit responsive to the data output signal from the differential pre-amplifier for generating the correction signal to cause the differential pre-amplifier to cancel dc offset which may be contained in the digital data input signal, a differential post-amplifier having a first input for receiving the data output signal from the differential pre-amplifier, a second input for receiving a reference signal, and a data output, and a peak detector responsive to an output signal from the data output of the differential post-amplifier for detecting a peak amplitude thereof and for generating the reference signal such that the differential post-amplifier has a first gain value during the time the data input signal is absent or less than its peak amplitude, and has a second gain value approximately equal to twice the first gain value for a predetermined time after the peak amplitude of the data input signal is reached, the differential post-amplifier and the peak detector each having operating characteristics which are substantially matched to each other.

Preferably, the differential pre-amplifier has a first input for receiving the digital data input signal from optical detector means and a second input, and wherein the correction signal is applied to the first and second inputs of the differential pre-amplifier in a complementary amplitude relationship to each other, further comprising a capacitance element connected to the second input of the differential pre-amplifier, the capacitance element and the optical detector means having an equal capacitance value.

According to a second aspect of the present invention, the digital data receiver comprises a first emitter-coupled transistor pair having a first transistor for operating on the data output signal from the pre-amplifier and a second transistor for operating on the reference signal, a first Darlington-coupled, emitter-follower transistor pair coupled to respond to an output of the first transistor of the first emitter-coupled transistor pair for coupling an amplified output through a first feedback resistor to the first transistor of the first emitter-coupled transistor pair, a second Darlington-coupled, emitter-follower transistor pair coupled to respond to an output of the second transistor of the first emitter-coupled transistor pair. The peak detector comprises a peak hold capacitor, a second emitter-coupled transistor pair having a first transistor connected to respond to a voltage developed in,the peak hold capacitor, and a second transistor connected to respond to an out, put of the second Darlington-coupled, emitter-follower transistor pair, a current switching transistor connected to respond to an output of the second Darlington-coupled, emitter-follower transistor pair for charging the peak hold capacitor, and a buffer transistor for coupling the voltage developed in the peak hold capacitor through a second feedback resistor to the second transistor of the first emitter-coupled transistor pair as the reference signal. The first and second emitter-coupled transistor pairs have dc operating points which are matched to each other.

Preferably, the buffer transistor, one of the transistors of the Darlington-coupled, emitter-follower transistor pair and one of the transistors of the second Darlington-coupled, emitter-follower transistor pair have operating characteristics which are matched to each other.

According to a third aspect of the present invention, the digital data receiver further comprises first and second emitter feedback resistors connected respectively to the first and second transistors of the first emitter-coupled transistor pair, a variable resistor connected to the first emitter-coupled transistor pair for matching the dc operating point of the first emitter-coupled transistor pair to the dc operating point of the second emitter-coupled transistor pair, and third and fourth emitter feedback resistors connected respectively to the first and second transistors of the second emitter-coupled transistor pair. Preferably, the data receiver further includes first and second load resistors connected respectively to the first and second transistors of the first emitter-coupled transistor pair, wherein the variable resistor is connected in series with the first and second load resistors.

According to a fourth aspect of the present invention, the digital data receiver further comprises a reset circuit for producing a reset pulse following a transition of an output pulse of the second emitter-coupled transistor pair, the reset pulse being delayed by a predetermined time with respect to the transition, and a discharging circuit for discharging the peak hold capacitor in response to the reset pulse.

According to a fifth aspect of the present invention, the dc offset cancelling circuit comprises a low-level detector for producing a low-level signal representative of a minimum level of the digital data input signal during the time the data input signal is absent or less than its peak amplitude, and a comparator circuit for comparing the low-level signal with a reference voltage to detect a difference therebetween and producing therefrom the correction signal. Preferably, the comparator circuit is of a differential-input and differential-output configuration for generating a pair of complementarily variable signals as the correction signal. In a preferred embodiment, the low-level detector comprises a differential input-differential output booster amplifier connected to the outputs of the differential pre-amplifier, a peak detector connected to one of the differential outputs of the booster amplifier, a buffer amplifier, and a circuit that couples the peak detector to one of the differential outputs of the booster amplifier and couples the buffer amplifier to the other differential output of the booster amplifier for generating the reference voltage, so that the buffer amplifier and the peak detector have dc operating characteristics which are matched to each other and the reference voltage is substantially equal to an output voltage generated by the booster amplifier when a difference between input voltages of the booster amplifier is substantially zero.

BRIEF DESCRIPTION OF THE DRAWINGS

Other features and advantages of the present invention will be described in further detail with reference to the accompanying drawings, in which.

DETAILED DESCRIPTION

Figure 1:
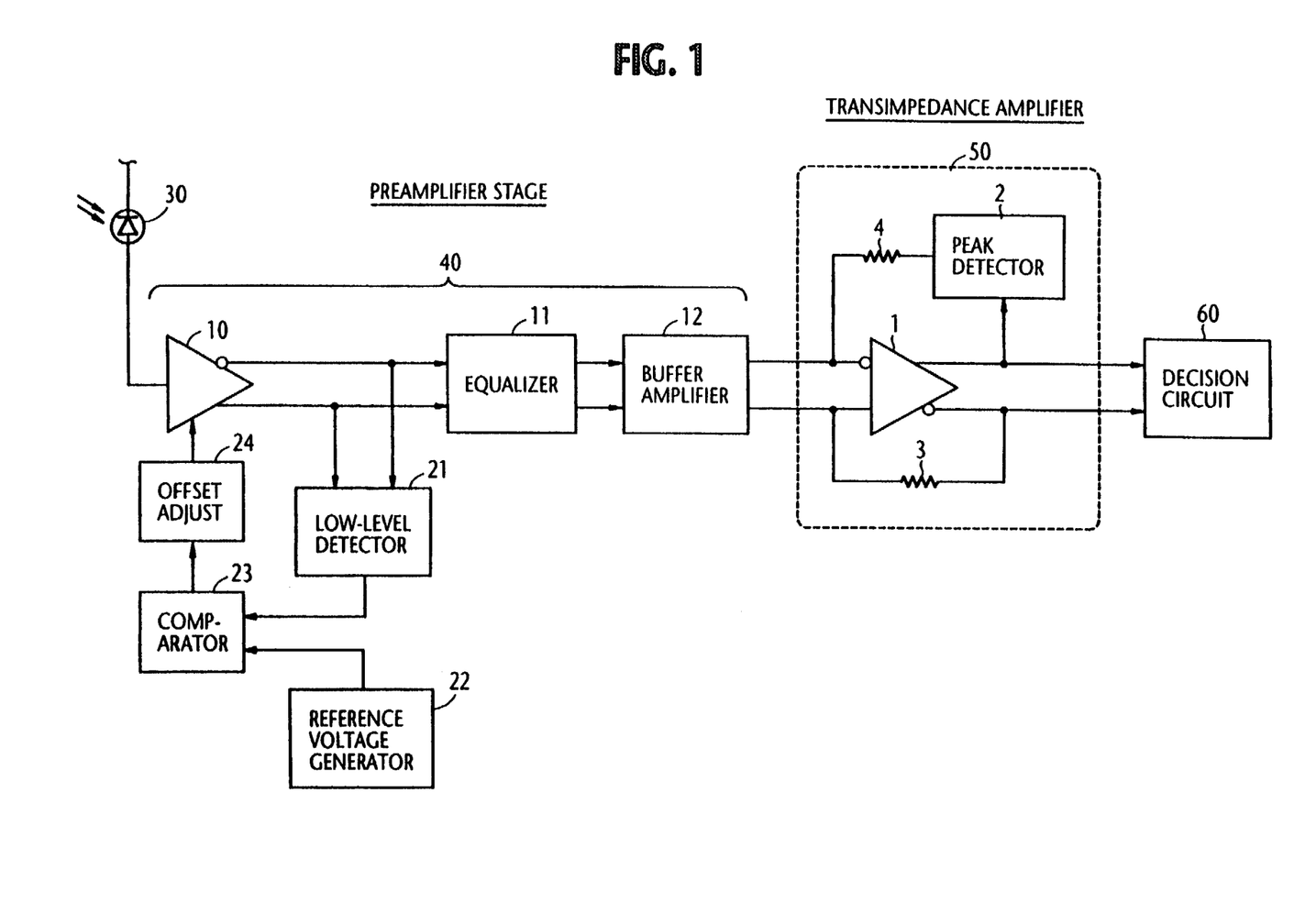
FIG. 1 is a block diagram of a dual-mode optical receiver according to the present invention.

Referring now to FIG. 1, there is shown a burst-mode optical receiver according to the present invention. The receiver generally comprises preamplifier stage 40 and a transimpedance stage 50. The preamplifier stage 40 comprises a gain-controlled preamplifier 10 having an input terminal and a pair of differential output terminals. The input terminal of the preamplifier 10 is connected to receive an optical data input signal from a photodiode 30 to produce a pair of amplified output signals of complementary values which are coupled to a waveform equalizer 11. The outputs of equalizer 11 are applied to a buffer 12 where the voltage inputs from the equalizer are converted to currents. The outputs of buffer 12 are coupled to a transimpedance amplifier 50 which comprises a differential amplifier 1 having a pair of differential input terminals connected to the outputs of buffer 12 and a pair of differential output terminals. A peak detector 2 and a feedback resistor 4 are connected between the positive output terminal of amplifier 1 and the negative input of this amplifier, and a second feedback resistor 3 is connected between the negative output and positive input terminals of the amplifier. The outputs of the differential amplifier 1 are applied to a decision circuit 60. The outputs of preamplifier 10 are further applied to a low-level detector 21 where a low-level signal is detected and supplied to a difference detector, or comparator 23 in which it is compared with a reference voltage supplied from a reference voltage source 22 to detect the difference between them. Comparator 23 adaptively controls the offset of the preamplifier 10 via an offset adjust resistor network 24 to cancel the dc drift which may be present in the input data signal. As will be described in detail later, the difference between the reference level and the output of the preamplifier during a series of low-level inputs is kept constant and erroneous threshold decision can be avoided.

Figure 2:
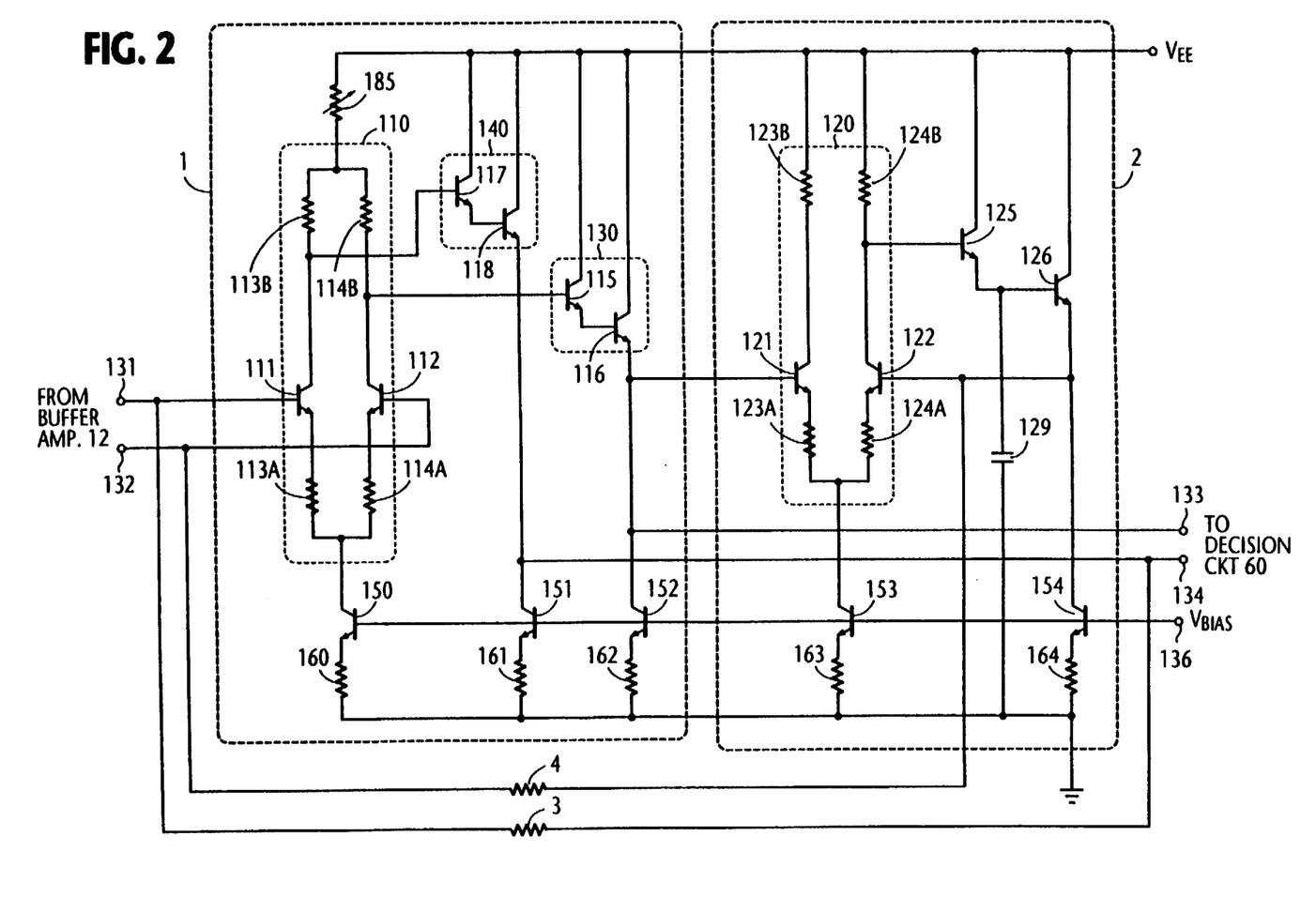
FIG. 2 is a circuit diagram illustrating details of a transimpedance amplifier.

As illustrated in FIG. 2, the differential amplifier 1 is comprised of an emitter-coupled differential amplifier 110 formed by transistors 111, 112; a first emitter-follower Darlington-coupled level shifter 130 formed by transistors 115, 116; a second emitter-follower Darlington-coupled level shifter 140 formed by transistors 117, 118; and current sources 150~152 for differential amplifier 110, and level shifters 140 and 130, respectively. Transistors 111 and 112 have their bases coupled respectively through input terminals 131, 132 to the outputs of buffer 12 to which feedback resistors 3 and 4 are connected, and level shifters 140 and 130 are connected to the collector of transistors 111 and 112, respectively. Resistors 160~162 are bias current resistors for current sources 150~152, respectively, and a variable resistor 185 is an offset adjusting resistor having a resistance value variable from zero to a few hundred ohms. Resistors 113A, 114A are the emitter negative feedback resistors for transistors 111, 112 and resistors 113B, 114B are the load resistors of these transistors. The emitter of transistor 116 is connected through an output terminal 133 to one input of the decision circuit and the emitter of transistor 118 is connected through an output terminal 134 to the other input of the decision circuit and further connected by the feedback resistor 3 to the input terminal 131 to which the base of transistor 111 is connected.

Peak detector 2 is composed of an emitter-coupled differential amplifier 120 formed by transistors 121, 122; a current switching transistor 125 having its base coupled to the positive output of the emitter-coupled differential amplifier 120 and its emitter coupled to a peak-hold capacitor 129, and a transistor 126 which serves as a buffer amplifier; current sources 153 and 154 for amplifier 120 and transistor 126, respectively. Resistors 163 and 164 are bias current resistors for current sources 153 and 154, respectively. The transistor 126 has its base coupled to the emitter of the current switching transistor 125 and its emitter coupled to the base of transistor 122 which is the negative input of the emitter-coupled differential amplifier 120. Resistors 123A, 124A are the emitter negative feedback resistors of transistors 121, 122 and resistors 123B, 124B are the load resistors of these transistors. The base of transistor 121 is coupled to the emitter of transistor 116 which leads to the output terminal 133, and the emitter of transistor 126 is connected to the base of transistor 122 and further connected by feedback resistor 4 to the input terminal 132 to which base of transistor 112 is connected.

Emitter-coupled differential amplifiers 110 and 120 have dc operating fi characteristics which are matched to each other. Additionally, transistors 116, 118 and 126 have operating characteristics which are matched to each other, and their bias currents are equal to each other. All transistors 150~154 are biased by voltage supplied from a terminal 136.

The offset adjust resistor 185 is used to precisely match fie dc operating point of the differential amplifier 1 to the operating point of the peak detector 2 by making the difference between the outputs of emitter-coupled differential amplifiers 110 and 120 to zero and matching the base-emitter voltages of transistors 116, 117 and 125 to each other, and matching the base-emitter voltages of transistors 116, 118 and 126 to each other. Therefore, the difference, or offset voltage of the transimpedance amplifier 50 that appears across the output terminals 133 and 134 is constantly held at substantially zero in a wide temperature and operating voltage ranges.

On the other hand, the internal offset voltage $\Delta V$ of each closed-loop of the transimpedance circuit 50 is reduced to $1/(1+A)$ of the offset voltage that occurs during open-loop, (where A is the open loop gain), a fine adjustment of the offset $\Delta V$ within the feedback loop can result in a precisely controlled decision threshold (reference value). To achieve this it is necessary that the open-loop gain of each feedback loop have a low temperature dependent characteristic. Specifically, this is achieved by the provision of the emitter feedback resistors 113A, 114A, 123A and 124A. Each of these emitter feedback resistors has a much higher resistance value than the emitter resistance of the associated transistor, Therefore, the ratio of the load resistance at the collector of transistor 111 (112, 121, 122) to its emitter resistor is substantially determined by the resistance ratio of resistor 113B (114B, 123B, 124B) to resistor 113A (114A, 123A, 124A). The dynamic operating range of each of the differential amplifier 1 and the peak detector 2 is increased in this way. Since the temperature-dependent characteristic of these resistors can be ignored, the temperature-dependent characteristic of the open-loop gain of both differential amplifier 1 and the peak detector 2 is negligibly small. Thus, the output offset voltage of the transimpedance amplifier remains constant under varying ambient temperature even through the operating points of both differential amplifier 1 and peak detector 2 are adjusted by resistor 185.

Since the maximum value of resistor 185 is several hundred ohms, no current source (of the order of submicro-amperes) is required.

In the prior art optical receiver as disclosed in the aforesaid United States patent, off-chip variable resistors R15, R20 of several megohms are required for offset current injection because of the use of current sources of the order of submicro-amperes (in FIG. 12 of the patent). This imposes limitations on the insulation resistance of a substrate on which the circuit is fabricated. In addition, there is a voltage difference of 0.3 volts between a 0.5-volt base-emitter voltage of the capacitor switching transistor Q19 where substantially no current flows and a 0.5-volt base-emitter voltage of the transistor Q5 where a large current is drained by transistor Q6 of diode connection. Thus, the prior art transimpedance amplifier, taken as a whole, develops an offset voltage and due to the temperature-dependent characteristic of its differential amplifier, the offset voltage has a large temperature-dependent characteristic. Due to this temperature-dependency of the offset voltage, the sensitivity of the prior art optical receiver will have a power penalty of about 3 dB in a temperature range of $-20°$ C. to $80°$ C. according to the *Journal of Lightwave Technology*, Vol. 8, No. 12, page 1900.

Figure 3:
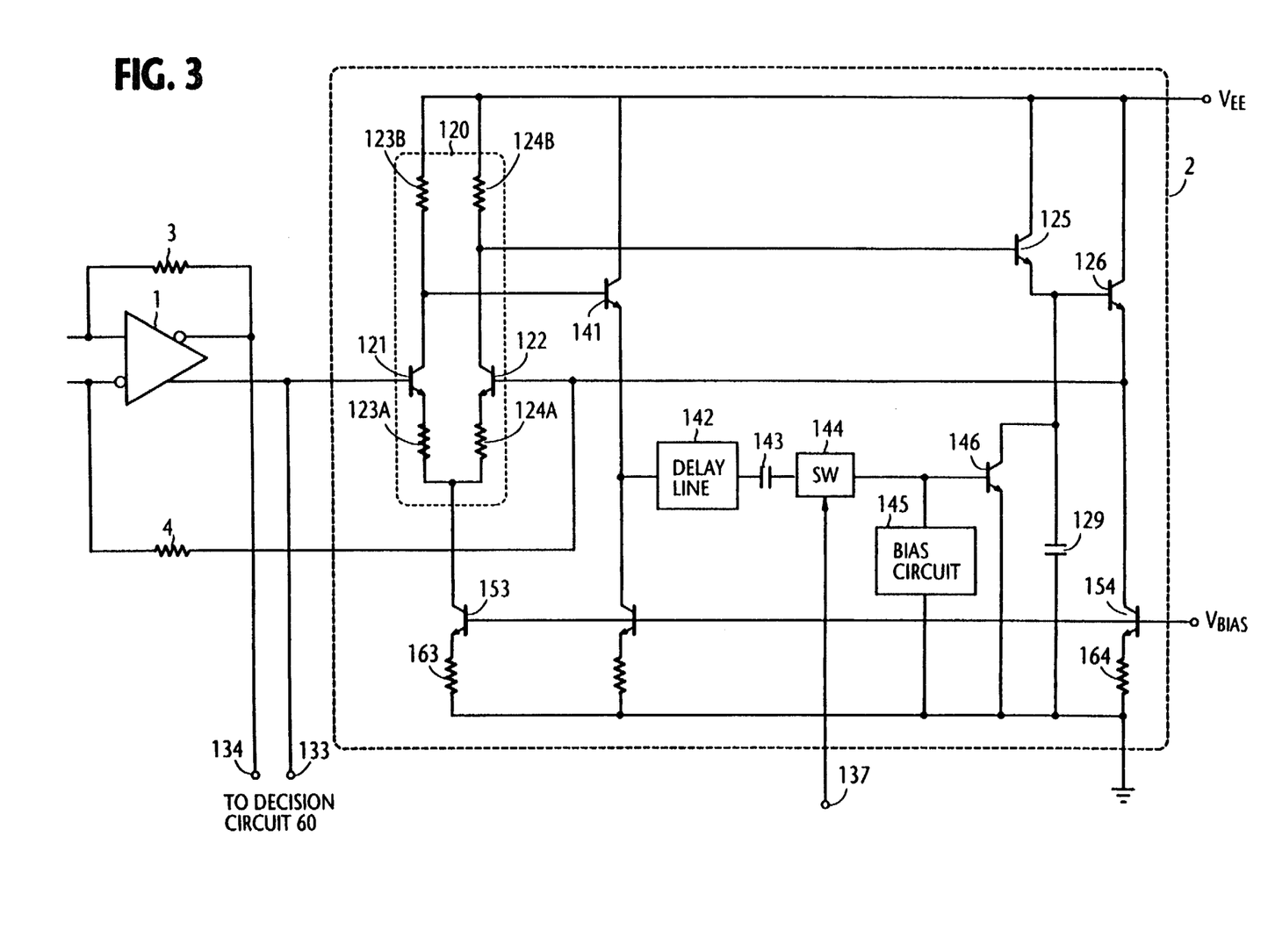
FIG. 3 is a circuit diagram of a transimpedance amplifier which is modified to include a high-speed resetting circuit.

The peak detector 2 is modified as shown in FIG. 3 to include a reset circuit of active pull-down configuration for high speed resetting of decision threshold. A reset transistor 146, biased by a circuit 145, is in parallel with the peak hold capacitor 129 for rapidly discharging it in response to a reset signal. Transistor 146 is rendered conductive only when its gate potential exceeds the bias voltage. The negative output of emitter-coupled differential amplifier 120 is applied to the base of a transistor 141 which serves as a buffer stage for a delay line 142 having a delay time $\tau$ which is $\frac{1}{4}$ to $\frac{1}{2}$ of the period of a single bit. An edge detection capacitor 143, coupled to the output of delay line 142, has the effect of producing a narrow pulse at each of the leading and trailing edges of the output of the delay line and feeding the pulses through an analog switch 144 to the base of transistor 146. Analog switch 144 is turned on in response to a gate-on pulse supplied through a terminal 137.

Figure 4:
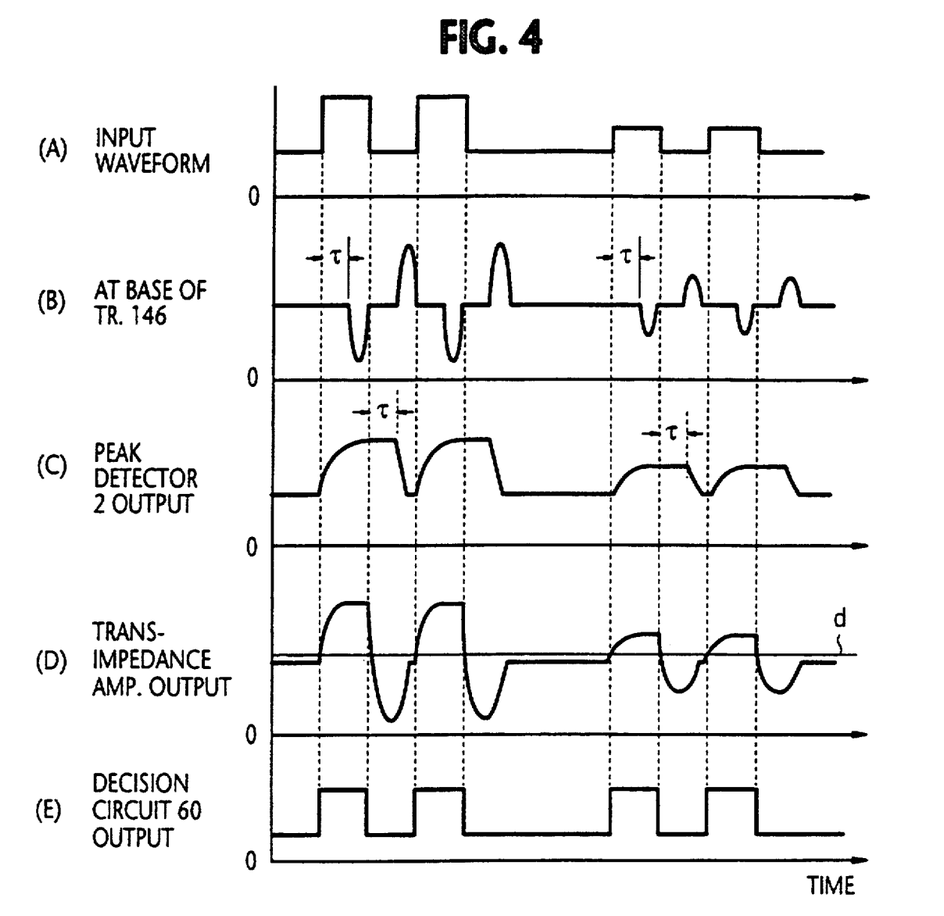
FIG. 4 is a timing diagram associated with the embodiment of FIG. 3.

The operation of the reset circuit is described with reference to FIG. 4 by assuming that, with the analog switch 144 being turned on, a series of input pulses of relatively high amplitude followed by input pulses of relatively low amplitude, as shown in part (A) of FIG. 4, is applied to the gate of transistor 141. An inverted waveform of the input pulses is applied to delay line 142 where they are delayed by delay time $\tau$ and the edges of the delayed pulses are detected by the differenting capacitor 143, producing a series of pulses of opposite polarities, as shown in part (B) of FIG. 4, which is superimposed on the bias voltage to the gate of transistor 146. Thus, the resetting transistor 146 is turned on, discharging peak-hold capacitor 129, in response to only positive-going pulses of the input pulse signal, each of which occurs a delay-time $\tau$ after the trailing edge of the corresponding input pulse. Since the amplitude of the reset pulse is proportional to the amplitude of the corresponding input pulse, and hence to the amount of the corresponding charge in the peak-hold capacitor 129, the latter is able to complete its discharge action within the same interval of time for different pulse amplitudes. Resistor 123B and capacitor 143 determine the amplitude and duration of the reset pulse. In a typical example, the interval between the application of a reset pulse and the end of a discharge is set approximately equal to 2/5 of the bit interval. As a result, the output voltage pulse of the peak detector Z rises from zero to a peak amplitude which is held for the duration of $\tau$ and then decays to zero within the bit interval as indicated in part (C) of FIG. 4. As illustrated in part (D) of FIG. 4, the transimpedance amplifier 50 switches from cold mode to warm mode at the instant the input pulse reaches its peak value and begins to perform adaptive threshold control as it decays to zero, and then returns to cold mode within the bit interval, resetting the adaptive threshold control. In this way, the decision circuit would correctly interpret the output of the transimpedance amplifier with respect to the decision threshold "d" and produce a sequence of decision output pulses as shown in part (E) of FIG. 4.

Because of the resetting feature, the adaptive threshold control of this invention can adapt itself to input pulses of very high amplitudes following a sequence of low-amplitude input pulses if there is a guard time of at least one bit interval between the successive pulse sequences.

If the input pulse sequence is a packet and the receiver knows when it ends by examining its packet length indicator, and if it is desired in certain applications (due to photodetector's low extinction ratio of the photo) to operate the receiver continuously in a warm mode during the pulse sequence, the gate-off pulse may be generated during the period of the pulse sequence and a gate-on pulse is instantly generated following the pulse sequence to reset the peak hold capacitor 129.

Figure 5:
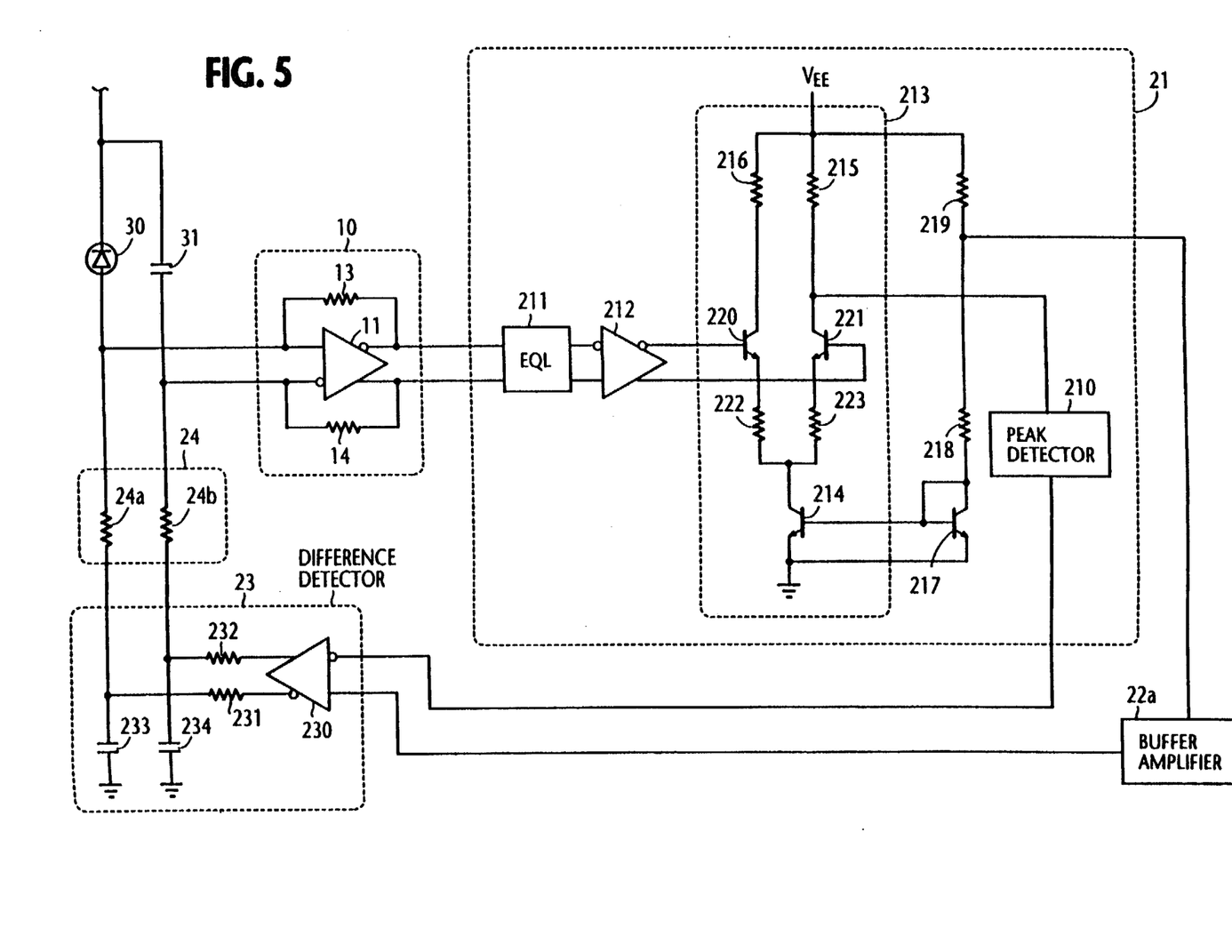
FIG. 5 is a circuit diagram illustrating a circuit according to a modified embodiment of the present invention.

FIG. 5 illustrates a preamplifier circuit according to a modified embodiment of the present invention which is useful for cancelling a DC offset of the optical input signal. The preamplifier 10 comprises a double-ended differential amplifier 11 of transimpedance configuration having a resistor 13 coupled between the negative output and the positive input to which the photodiode 30 is connected, and a resistor 14 coupled between the positive output and the negative input. To the negative input of the preamplifier 10 is connected a capacitor 31 having a capacitance matched to the parasitic capacitance of photodiode 30. The low-level detector 21 comprises an equalizer 211 connected to the double-ended outputs of preamplifier 10 to remove ripple components, a double-ended differential booster amplifier 212 connected to the equalizer, a differential input-single ended amplifier 213, and a peak detector 210. The amplifier 213 is an emitter-coupled transistor pair formed by transistors 220, 221 with their emitters connected through feedback resistors 222, 223 to the collector of a transistor 214 whose emitter is grounded and their collectors connected through load resistors 215, 216 to the voltage source $V_{EE}$. The emitter-coupled transistor pair 213 is in shunt with a constant-current circuit formed by a transistor 217 of diode configuration, and resistors 218 and 219, with the gates of transistors 214 and 217 being connected together. Transistors 214 and 217 have operating characteristics which are matched to each other, and resistor 215 has twice the value of resistor 219.

The reference voltage source includes a voltage-follower buffer amplifier 22a which derives the reference voltage from the junction between resistors 218 and 219. The voltage-follower buffer amplifier 22a and the peak detector 210 have dc operating characteristics which are matched to each other.

The comparator 23 consists of a double ended differential amplifier 230 having differential inputs to which the outputs of buffer 22a and peak detector 210 are respectively connected. The negative output of amplifier 230 leads through resistor 231 and an offset adjust resistor 24a to the positive input of preamplifier 10, while the negative output of amplifier 230 leads through a resistor 232 and an offset adjust resistor 24b to the negative input of preamplifier 10. The junctions between resistors 231, 24a, 232, 24b are connected to ground by capacitors 233, 234. Resistors 231, 232 and capacitors 233, 234 constitute integrator circuits (or lowpass filters) respectively for the positive and negative inputs of the preamplifier 10. Comparator 23 thus detects the difference between the reference voltage from buffer 22a and the output of peak detector 210, amplifies the difference and produces difference voltages which are integrated into appropriate control by integrating capacitors 233, 234. In response to the voltages developed across the integrating capacitors 233, 234, offset adjust resistors 24a, 24b inject offset currents to the preamplifier 10. The reference voltage from buffer amplifier 22a is substantially equal to an output voltage generated by the booster amplifier 212 when the difference between the input voltages of the booster amplifier is substantially zero.

The operation of the preamplifier circuit of FIG. 5 is as follows. If the optical input signal is at minimum level (in the absence of signal or a series of relatively low amplitude inputs), the peak detector 210 produces a maximum amplitude output as a peak value. If the optical data signal at the positive input of preamplifier 10 contains a dc offset current, it produces a difference output across its positive and negative outputs. With an increase in the dc offset current, the difference voltage output from preamplifier 10 proportionally increases and an inverted version of this difference voltage appears at the input of the peak detector 210 of the low-level detector 21. Thus, the output of peak detector 210 decreases from the peak value by an amount corresponding to the dc offset component, and the difference between the reference voltage and the peak detector 210 output, as detected by the comparator 23, increases. Therefore, the voltage at the positive output of differential amplifier 230 increases and there is a corresponding decrease in voltage developed across the offset adjust resistor 24b, while the voltage at the negative output of differential amplifier 230 decreases and there is a corresponding increase in voltage across resistor 24a.

If each of the feedback loops of the preamplifier circuit has an open-loop gain A, an offset that occurs in the output voltage of the loop that results from the dc offset current is reduced to 1/(1+A). If the open-loop gain A is "1000", the optical receiver of this invention is able to receive an optical signal of −40 dBm in the presence of an optical dc offset power of −25 dBm.

Temperature and voltage fluctuation are of another important concern for the design of precision feedback circuits. Because of the matched operating characteristics of transistors 214 and 217, equal collector currents flow through these transistors. Under steady state, the difference output of the differential amplifier 212 is zero for low-level input, and the current flowing through resistor 215 is one half the collector current of transistor 214 and one half of the current flowing through resistor 219. As a result, the voltage drop across resistor 215 matches to the voltage drop across resistor 219 and this relation holds under varying temperatures and operating voltage. The input voltage difference to comparator 230 reduces to zero to which the dc operating point of differential amplifier 212 is stabilized.

Figure 6:
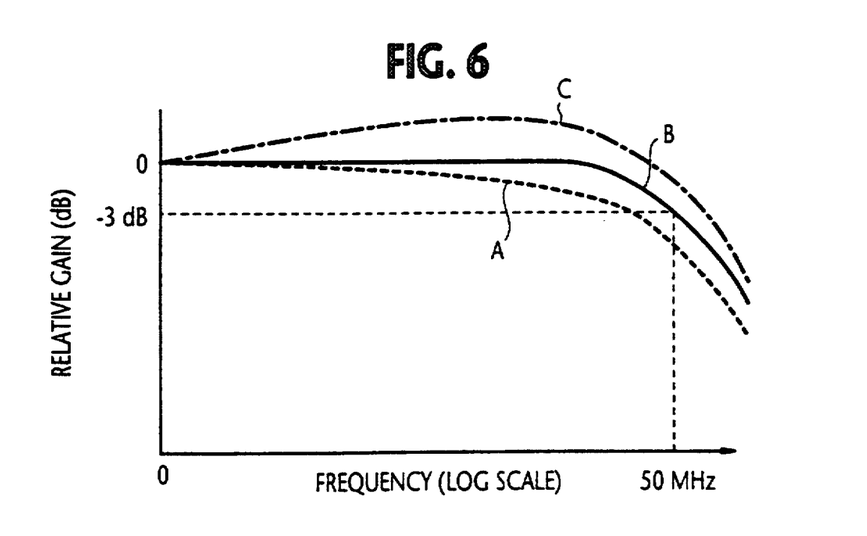
FIG. 6 is a graphic representation of frequency response characteristics of a differential amplifier under matched and mismatched input capacitances.

The effect of capacitor 31 is to flatten the frequency response characteristic of the preamplifier 10. If the capacitances at the differential inputs are not matched to each other, the frequency response of the preamplifier deviates from what is desired. As illustrated in FIG. 6, if the capacitance at the positive input is greater than the capacitance at the negative input, the frequency response gradually decays at low frequency point as indicated by a curve "A" in FIG. 6. Conversely, if the capacitance at the positive input is smaller than the capacitance at the negative input, the frequency response gradually increases at low frequency point and stars decaying at a cut-off frequency of 50 MHz as shown at "C" in FIG. 6. If the capacitance values are ideally matched to one another at the differential inputs, a substantially flat frequency response characteristic, as shown at "B" in FIG. 6, will be obtained.

In summary, the provision of a preamplifier stage 40 allows optimization of this preamplifier stage exclusively in terms of cold mode or warm mode of the transimpedance amplifier 50 and the optical receiver, as a whole, can be designed to provide high receiver sensitivity. More specifically, the present invention allows preamplifier 10 to be designed to meet low noise requirements, while allowing transimpedance amplifier 50 to be designed to provide a sufficient phase margin to prevent peak detector oscillation, thus ensuring a design freedom. Additionally, due to the use of differential amplifier configuration at the preamplifier stage, a constant device current flows regardless of the presence and absence of data input signals. This is advantageous for applications where preamplifier stages are implemented in an array on an integrated circuit chip where crosstalk can occur between the power circuits of the preamplifiers. The present invention eliminates such crosstalk problems and allows implementation of optical receivers in an array configuration.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A digital data receiver comprising:
 a pre-amplifier stage for receiving a digital data input signal and a correction signal and producing therefrom a data output signal;
 a dc offset cancelling circuit responsive to the data output signal from said pre-amplifier stage for generating said correction signal to cause said pre-amplifier stage to cancel dc offset which may be contained in said digital data input signal;
 a post-amplifier having a first input for receiving the data output signal from said pre-amplifier stage, a second input for receiving a reference signal, and a data output; and
 a peak detector responsive to an output signal from the data output of the post-amplifier for detecting a peak amplitude and for generating said reference signal such that said post-amplifier has a first gain value during the time said data input signal is absent or less than peak amplitude of the data input signal, and has a second gain value approximately equal to twice the first gain value for a predetermined time after the peak amplitude of the data input signal is reached, said post-amplifier and said peak detector each having operating characteristics which are substantially matched to each other.

2. A digital data receiver as claimed in claim 1, wherein said pre-amplifier stage has a first input for receiving said digital data input signal from optical detector means and a second input, and wherein said correction signal is applied to said first and second inputs of pre-amplifier stage in a complementary amplitude relationship to each other, further comprising a capacitance element (31) connected to the second input of the pre-amplifier stage, said capacitance element and said optical detector means having an equal capacitance value.

3. A digital data receiver as claimed in claim 1, wherein said post-amplifier comprises:
- a first emitter-coupled transistor pair having a first transistor for operating on said data output signal from said pre-amplifier stage and a second transistor for operating on said reference signal;
- a first Darlington-coupled, emitter-follower transistor pair coupled to respond to an output of the first transistor of the first emitter-coupled transistor pair for coupling an amplified output through a first feedback resistor to the first transistor of the first emitter-coupled transistor pair; and
- a second Darlington-coupled, emitter-follower transistor pair coupled to respond to an output of the second transistor of the first emitter-coupled transistor pair, and wherein said peak detector comprises:
- a peak hold capacitor;
- a second emitter-coupled transistor pair having a first transistor connected to respond to a voltage developed in said peak hold capacitor, and a second transistor connected to respond to an output of the second Darlington-coupled, emitter-follower transistor pair, said first and second emitter-coupled transistor pairs having dc operating points which are matched to each other;
- a current switching transistor connected to respond to an output of the second Darlington-coupled, emitter-follower transistor pair for charging said peak hold capacitor; and
- a buffer transistor for coupling the voltage developed in said peak hold capacitor through a second feedback resistor to said second transistor of the first emitter-coupled transistor pair as said reference signal.

4. A digital data receiver as claimed in claim 3, wherein the buffer transistor, one of the transistors of the Darlington-coupled, emitter-follower transistor pair and one of the transistors of the second Darlington-coupled, emitter-follower transistor pair have operating characteristics which are matched to each other.

5. A digital data receiver as claimed in claim 3, further comprising:
first and second emitter feedback resistors connected respectively to the first and second transistors of the first emitter-coupled transistor pair;
variable resistor means connected to the first emitter-coupled transistor pair for matching the dc operating point of the first emitter-coupled transistor pair to the dc operating point of the second emitter-coupled transistor pair; and
third and fourth emitter feedback resistors connected respectively to the first and second transistors of the second emitter-coupled transistor pair.

6. A digital data receiver as claimed in claim 5, further comprising first and second load resistors connected respectively to the first and second transistors of the first emitter-coupled transistor pair, wherein said variable resistor means is connected in series with said first and second load resistors.

7. A digital data receiver as claimed in claim 3, further comprising:
means for producing a reset pulse following a transition of a pulse produced by said second emitter-coupled transistor pair, said reset pulse being delayed by a predetermined time with respect to said transition; and
means for discharging said peak hold capacitor in response to said reset pulse.

8. A digital data receiver as claimed in claim 7, further comprising gate means connected between said reset pulse producing means and said discharging means for controlling passage of said reset pulse to said discharging means in response to a control signal applied thereto.

9. A digital data receiver as claimed in claim 1, wherein said dc offset cancelling circuit comprises:
low-level detector means connected to said differential preamplifier stage for producing a low-level signal representative of a minimum level of said digital data input signal during the time said data input signal is absent or less than its peak amplitude; and
comparator means for comparing said low-level signal with a reference voltage and detecting a difference therebetween and producing therefrom said correction signal.

10. A digital data receiver as claimed in claim 9, wherein said comparator means is of a differential-input and differential-output configuration for generating a pair of complementarily variable signals as said correction signal.

11. A digital data receiver as claimed in claim 9, wherein said low-level detector means comprises:
differential input-differential output booster amplifier means connected to outputs of said differential pre-amplifier stage;
a peak detector connected to one of the differential outputs of the booster amplifier means;
a buffer amplifier; and
means for coupling the peak detector to one of the differential outputs of the booster amplifier means and coupling the buffer amplifier to the other differential output of the booster amplifier means for generating said reference voltage so that said buffer amplifier and said peak detector have dc operating characteristics which are matched to each other, and said reference voltage is substantially equal to an output voltage generated by said booster amplifier means when a difference between input voltages of said booster amplifier means is substantially zero.

12. A transimpedance amplifier comprising:
a first emitter-coupled transistor pair having a first transistor for operating on a data output signal and a second transistor for operating on a reference signal;
a first Darlington-coupled, emitter-follower transistor pair coupled to respond to an output of the first transistor of the first emitter-coupled transistor pair for coupling an amplified output through a first feedback resistor to the first transistor of the first emitter-coupled transistor pair;

a second Darlington-coupled, emitter-follower transistor pair coupled to respond to an output of the second transistor of the first emitter-coupled transistor pair;

a peak hold capacitor;

a second emitter-coupled transistor pair having a first transistor connected to respond to a voltage developed in said peak hold capacitor, and a second transistor connected to respond to an output of the second Darlington-coupled, emitter-follower transistor pair, said first and second emitter-coupled transistor pairs having dc operating points which are matched to each other;

a current switching transistor connected to respond to an output of the second Darlington-coupled, emitter-follower transistor pair for charging said peak hold capacitor; and a buffer transistor for coupling the voltage developed in said peak hold capacitor through a second feedback resistor to said second transistor of the first emitter-coupled transistor pair as said reference signal.

13. A transimpedance amplifier as claimed in claim 12, wherein the buffer transistor, one of the transistors of the Darlington-coupled, emitter-follower transistor pair and one of the transistors of the second Darlington-coupled, emitter-follower transistor pair have operating characteristics which are matched to each other.

14. A transimpedance amplifier as claimed in claim 12, further comprising:
first and second emitter feedback resistors connected respectively to the first and second transistors of the first emitter-coupled transistor pair;
variable resistor means connected to the first emitter-coupled transistor pair for matching the dc operating point of the first emitter-coupled transistor pair to the dc operating point of the second emitter-coupled transistor pair; and
third and fourth emitter feedback resistors connected respectively to the first and second transistors of the second emitter-coupled transistor pair.

15. A transimpedance amplifier as claimed in claim 14, further comprising first and second load resistors connected respectively to the first and second transistors of the first emitter-coupled transistor pair, wherein said variable resistor means is connected in series with said first and second lead resisters.

16. A transimpedance amplifier as claimed in claim 12, further comprising:
means for producing a reset pulse following a transition of an output pulse produced by said second emitter-coupled transistor pair, said reset pulse being delayed by a predetermined time with respect to said transition; and means for discharging said peak hold capacitor in response to said reset pulse.

17. A transimpedance amplifier as claimed in claim 16, further comprising gate means connected between said reset pulse producing means and said discharging means for controlling passage of said reset pulse to said discharging means in response to a control signal applied thereto.

18. A pre-amplifier circuit comprising:
a pre-amplifier for receiving a digital data input signal and a correction signal and producing therefrom a data output signal, said pre-amplifier having a pair of output terminals for producing complementary output signals;
low-level detector means connected to said pre-amplifier for producing a low-level signal representative of a minimum level of said digital data input signal during the time said data input signal is absent or less than a peak amplitude of the digital data input signal; and
comparator means having a first input for receiving said low-level signal and a second input for receiving a reference voltage and detecting a difference between said low-level signal and said reference voltage and producing therefrom said correction signal to cause said pre-amplifier to cancel dc offset which may be contained in said digital data input signal,
wherein said low-level detector means comprises:
differential-input and differential-output booster amplifier means connected to the output terminals of said pre-amplifier having differential outputs;
a peak detector having an input and an output, the output of the peak detector being connected to the first input of said comparator means;
a buffer amplifier having an input and an output, the output of the buffer amplifier being connected to the second input of said comparator means; and
means for coupling one of the differential outputs of the booster amplifier means to the input of said peak detector and coupling the other differential output of the booster amplifier means to the input of the buffer amplifier for causing said peak detector to produce said low-level signal and causing said buffer amplifier to produce said reference voltage so that said buffer amplifier and said peak detector have dc operating characteristics which are matched to each other and said reference voltage is substantially equal to an output voltage generated by said booster amplifier means when a difference between input voltages of said booster amplifier means is substantially zero.

19. A pre-amplifier circuit as claimed in claim 18, wherein said comparator means is of a differential-input and differential-output configuration for generating a pair of complementarily variable signals as said correction signal.

* * * * *

UNITED STATES PATENT AND TRADEMARK OFFICE
CERTIFICATE OF CORRECTION

PATENT NO.   : 5,430,765
DATED        : July 4, 1995
INVENTOR(S)  : Takeshi NAGAHORI It is certified that error(s) appears in the above-identified patent and that said Letters Patent is hereby corrected as shown below:

Col. 6, line 22, delete "fi".

Col. 6, line 29, delete "fie" and insert --the--.

Signed and Sealed this

Sixteenth Day of January, 1996

Attest:

BRUCE LEHMAN

Attesting Officer

Commissioner of Patents and Trademarks